(12) United States Patent
Akiyama

(10) Patent No.: US 11,204,544 B2
(45) Date of Patent: Dec. 21, 2021

(54) PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/094,897

(22) Filed: Nov. 11, 2020

(65) Prior Publication Data

US 2021/0141302 A1 May 13, 2021

(30) Foreign Application Priority Data

Nov. 11, 2019 (JP) .............................. JP2019-203875

(51) Int. Cl.
*G03B 33/12* (2006.01)
*G03B 21/20* (2006.01)

(52) U.S. Cl.
CPC ........... *G03B 33/12* (2013.01); *G03B 21/204* (2013.01); *G03B 21/2013* (2013.01); *G03B 21/2066* (2013.01)

(58) Field of Classification Search
CPC .. G03B 33/12; G03B 21/2013; G03B 21/204; G03B 21/2066

USPC .......................................................... 353/31
See application file for complete search history.

(56) References Cited

U.S. PATENT DOCUMENTS

2012/0140183 A1   6/2012   Tanaka et al.

FOREIGN PATENT DOCUMENTS

JP        2012-137744 A        7/2012

*Primary Examiner* — Jerry L Brooks
(74) *Attorney, Agent, or Firm* — Dority & Manning, P.A.

(57) ABSTRACT

A projector includes a first light source device configured to emit first light having a first wavelength band, a second light source device configured to emit second light having a second wavelength band, a first light modulator configured to modulate the first light, and a second light modulator configured to modulate the second light. The first light source device includes a first light emitting element configured to emit excitation light and a wavelength converter configured to convert the excitation light into the first light. The second light source device includes a second light emitting element configured to emit the second light, a diffuser configured to diffuse the second light, and an optical element having an aspherical surface. The optical element is disposed on an optical path of the second light between the diffuser and the second light modulator and is configured to increase field curvature on the second light modulator.

7 Claims, 6 Drawing Sheets

PROJECTOR

The present application is based on, and claims priority from JP Application Serial Number 2019-203875, filed Nov. 11, 2019, the disclosure of which is hereby incorporated by reference herein in its entirety.

BACKGROUND

1. Technical Field

The present disclosure relates to a projector.

2. Related Art

As a light source device used in a projector, a light source device that uses fluorescent light emitted from a phosphor when excitation light emitted from a light source is irradiated on the phosphor has been proposed.

JP-A-2012-137744 (Patent Literature 1) discloses a light source device including a solid-state light source unit including a semiconductor laser, a dichroic mirror, a fluorescent screen, a first phase difference plate, a reflection plate, and a second phase difference plate. In the light source device, blue light emitted from the semiconductor laser is separated into S polarized light and P polarized light by the dichroic mirror. The S polarized light is irradiated on the fluorescent screen and emits green and red fluorescent lights. The P polarized light is converted into circularly polarized light by the first phase difference plate and is reflected on the reflection plate and is made incident on the first phase difference plate again. The second phase difference plate is disposed between the solid-state light source unit and the dichroic mirror and controls a ratio of P polarized light and S polarized light of light made incident on the dichroic mirror.

In the light source device disclosed in Patent Literature 1, the dichroic mirror including a polarized light separating function is used to separate the blue light into the S polarized light and the P polarized light. However, in the dichromic mirror of this type, since a ratio of the S polarized light and the P polarized light deviates from a desired value because of the influence of thermal stress or the like, a white balance of illumination light changes. Therefore, there has been examined a light source device including a dichroic mirror in which an optical path of illumination light and an optical path of excitation light are independently provided and that does not have a polarized light separating function in the optical path of the excitation light and reflects blue light and transmits yellow fluorescent light.

However, when the two optical paths are independently provided, because of a difference between characteristics of an optical component relating to the illumination light and an optical component relating to the excitation light, an illuminance distribution of the blue light and an illuminance distribution of color lights other than the blue light, that is, green light and red light on a light modulating device are sometimes different. In this case, color unevenness occurs in an image obtained by combined light of the color lights.

SUMMARY

A projector according to an aspect of the present disclosure includes a first light source device configured to emit first light having a first wavelength band, a second light source device configured to emit second light having a second wavelength band different from the first wavelength band, a first light modulator configured to modulate the first light emitted from the first light source device, and a second light modulator configured to modulate the second light emitted from the second light source device. The first light source device includes a first light emitting element configured to emit excitation light having an excitation wavelength band and a wavelength converter configured to convert the excitation light into the first light having the first wavelength band different from the excitation wavelength band. The second light source device includes a second light emitting element configured to emit the second light, a diffuser configured to diffuse the second light emitted from the second light emitting element, and an optical element having an aspherical surface. The optical element is disposed on an optical path of the second light between the diffuser and the second light modulator and is configured to increase field curvature on the second light modulator.

In the projector according to the aspect of the present disclosure, the second light modulator may be disposed in a position where the optical element is focused on a peripheral edge portion of the second light modulator rather than a center of the second light modulator.

In the projector according to the aspect of the present disclosure, the optical element may be an aspherical concave mirror configured to reflect the second light emitted from the diffuser.

In the projector according to the aspect of the present disclosure, the second light source device may further include a concave mirror configured to reflect the second light emitted from the diffuser, and the optical element may be an aspherical compensating plate disposed on the optical path of the second light between the diffuser and the concave mirror.

In the projector according to the aspect of the present disclosure, the optical element may be configured to generate a barrel distortion aberration on the second light modulator.

In the projector according to the aspect of the present disclosure, the first light source device may further include an integrator optical system including a convex lens disposed on the optical path of the first light between the wavelength converter and the first light modulator.

In the projector according to the aspect of the present disclosure, each of the first light emitting element and the second light emitting element may be a laser light source.

DESCRIPTION OF EXEMPLARY EMBODIMENTS

First Embodiment

A first embodiment of the present disclosure is explained below with reference to FIGS. 1 to 6.

Figure 1:
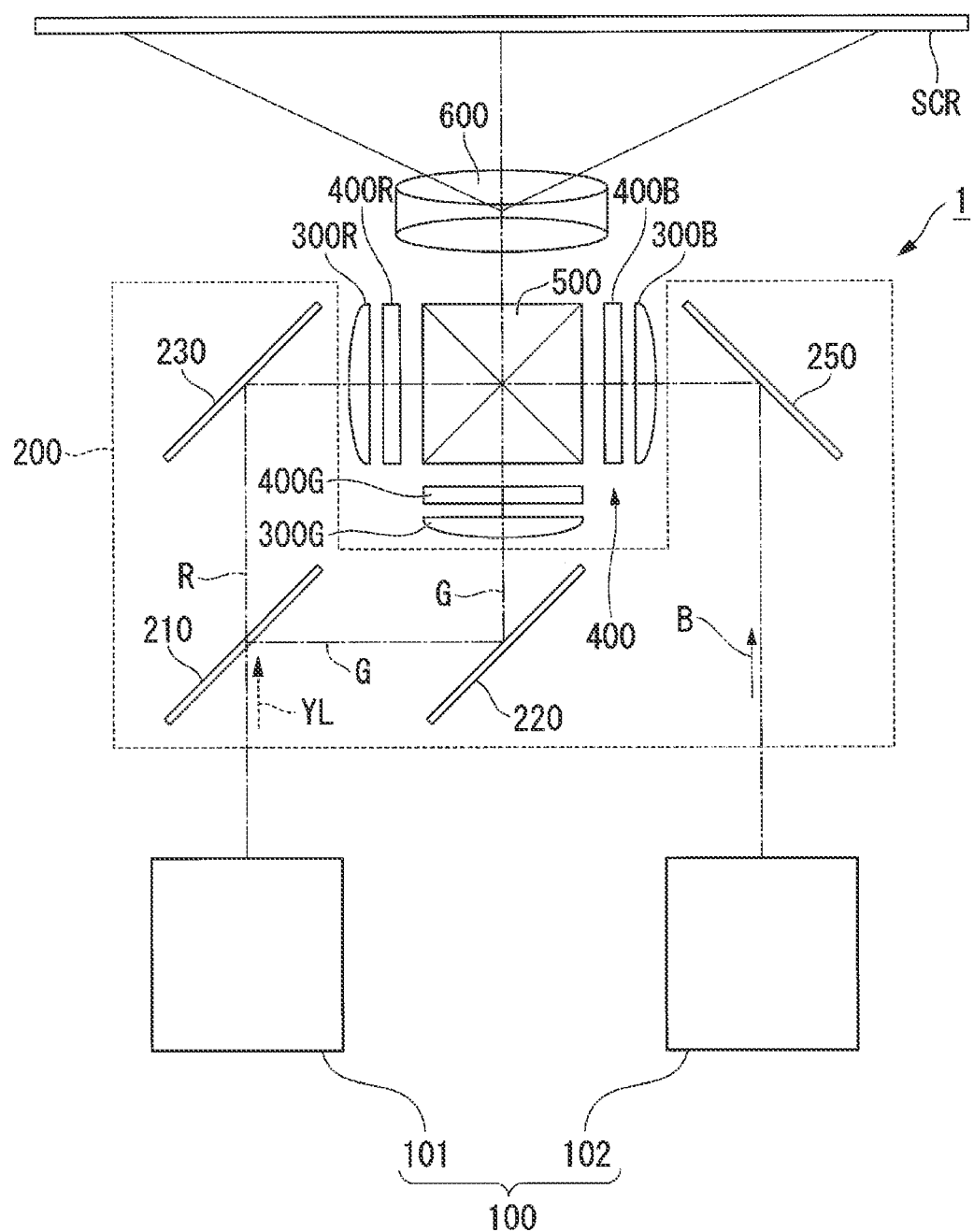
FIG. 1 is a schematic configuration diagram of a projector in a first embodiment.

FIG. 1 is a schematic configuration diagram of a projector in this embodiment.

In the drawings referred to below, scales of dimensions are sometimes differentiated and shown depending on components in order to clearly show the components.

As shown in FIG. 1, a projector 1 in this embodiment includes an illumination device 100, a color separation light guide optical system 200, a light modulator for red color light 400R (a first light modulator), a light modulator for green light 400G (a first light modulator), a light modulator for blue light 400B (a second light modulator), a cross dichroic prism 500, and a projection optical device 600.

The illumination device 100 includes a first light source device 101 and a second light source device 102. The first light source device 101 emits yellow fluorescent light YL including red light R and green light G toward the color separation light guide optical system 200. The second light source device 102 emits blue light B toward the color separation light guide optical system 200.

The color separation light guide optical system 200 includes a dichromic mirror 210, a reflection mirror 220, a reflection mirror 230, and a reflection mirror 250. The color separation light guide optical system 200 separates the yellow fluorescent light YL emitted from the first light source device 101 into the red light R and the green light G, guides the red light R to the light modulator 400R, and guides the green light G to the light modulator 400G. The color separation light guide optical system 200 guides the blue light B emitted from the second light source device 102 to the light modulator 400B.

A field lens 300R is provided between the color separation light guide optical system 200 and the light modulator 400R. A field lens 300G is provided between the color separation light guide optical system 200 and the light modulator 400G. A field lens 300B is provided between the color separation light guide optical system 200 and the light modulator 400B.

The dichroic mirror 210 transmits the red light R and reflects the green light G. The reflection mirror 220 reflects the green light G reflected by the dichroic mirror 210. The reflection mirror 230 reflects the red light R transmitted through the dichroic mirror 210. The reflection mirror 250 reflects the blue light B emitted from the second light source device 102.

The red light R transmitted through the dichromic mirror 210 is reflected by the reflection mirror 230, transmitted through the field lens 300R, and made incident on an image forming region of the light modulator for red light 400R. The green light G reflected by the dichroic mirror 210 is further reflected by the reflection mirror 220, transmitted through the field lens 300G, and made incident on an image forming region of the light modulator for green light 400G. The blue light B reflected by the reflection mirror 250 is made incident on an image forming region of the light modulator for blue light 400B through the field lens 300B.

The light modulator 400R, the light modulator 400G, and the light modulator 400B modulate the color lights made incident thereon according to image information and form image lights corresponding to the colors. Each of the light modulator 400R, the light modulator 400G, and the light modulator 400B is configured by a liquid crystal panel. Although illustration is omitted, incident-side polarization plates are respectively disposed on light incident sides of the light modulator 400R, the light modulator 400G, and the light modulator 400B. Emission-side polarization plates are respectively disposed on light emission sides of the light modulator 400R, the light modulator 400G, and the light modulator 400B.

The cross dichroic prism 500 combines the image lights emitted from the light modulator 400R, the light modulator 400G, and the light modulator 400B to generate combined light and forms a color image. The cross dichroic prism 500 is formed in a substantially square shape in plan view obtained by pasting together four right-angle prisms. A dielectric multilayer film is provided on a substantially X-shaped interface of the right-angle prisms pasted together.

The projection optical device 600 enlarges and projects the combined light emitted from the cross dichroic prism 500 onto a screen SCR and forms a color image.

The configuration of the first light source device 101 is explained below.

Figure 2:
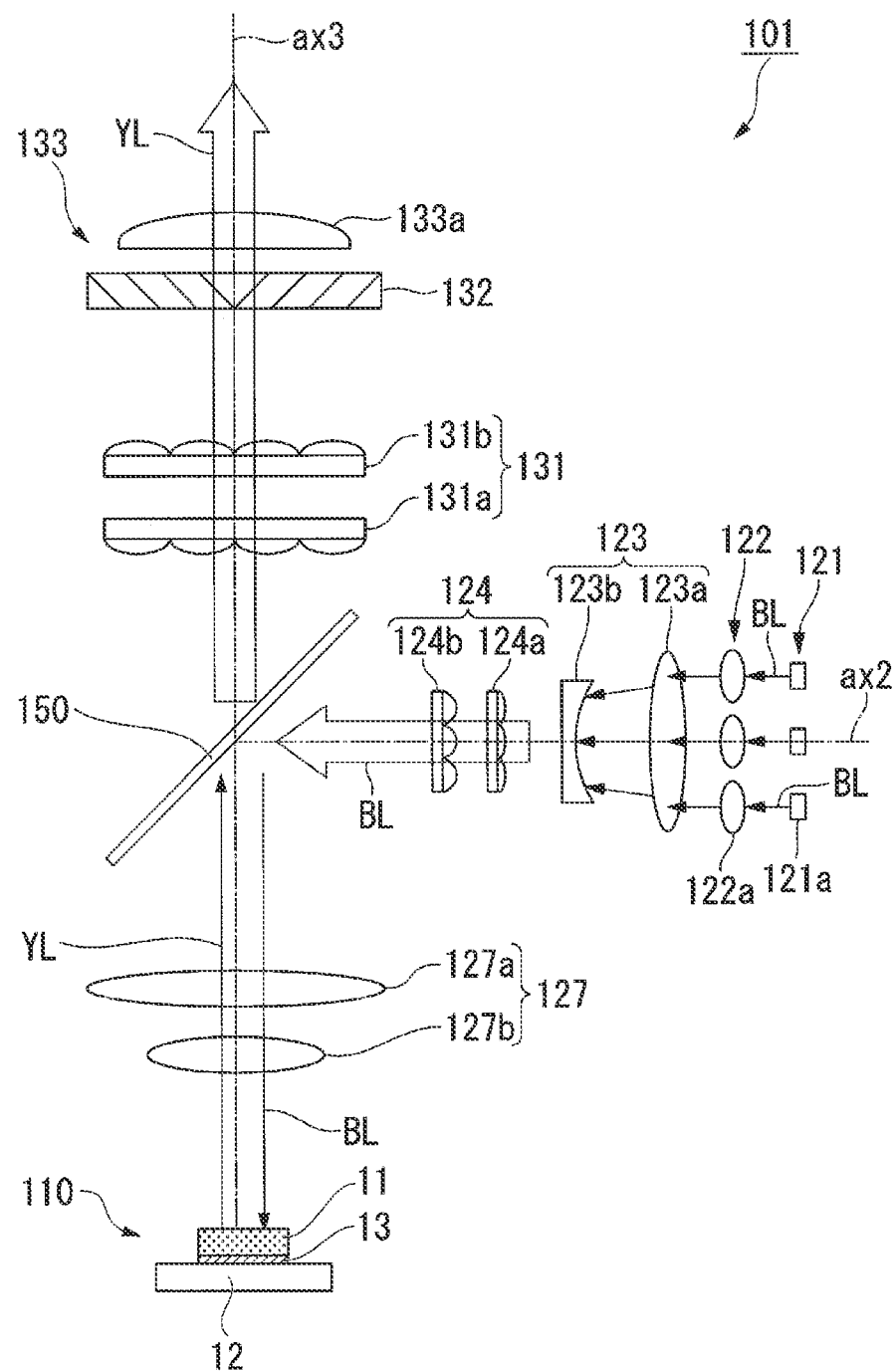
FIG. 2 is a schematic configuration diagram of a first light source device.

FIG. 2 is a schematic configuration diagram of the first light source device 101.

As shown in FIG. 2, the first light source device 101 includes a first light emitting section 121, a collimator optical system 122, an afocal optical system 123, a homogenizer optical system 124, a dichroic mirror 150, a pickup optical system 127, a wavelength converter 110, an integrator optical system 131, a polarization converter 132, and a superimposing optical system 133.

The first light emitting section 121 includes a plurality of first light emitting elements 121a. The plurality of first light emitting elements 121a are arrayed in an array shape in a plane orthogonal to an optical axis. The number of the first light emitting elements 121a is not particularly limited. The first light emitting elements 121a emit, for example, excitation lights BL having an excitation wavelength band of 440 to 470 nm. That is, the excitation lights BL are lights in a blue wavelength band. The first light emitting element 121a is configured by a semiconductor laser light source that emits linearly polarized light.

In this embodiment, an optical path of a main beam emitted from a first light emitting element 121a in the center of the first light emitting section 121 is represented as optical axis ax2. An optical path of a main beam of light emitted from the wavelength converter 110 explained below is represented as optical axis ax3. The optical axis ax2 and the optical axis ax3 are present in the same plane and are orthogonal to each other.

On the optical axis ax2, the first light emitting section 121, the collimator optical system 122, the afocal optical system 123, the homogenizer optical system 124, and the dichroic mirror 150 are disposed side by side in this order. On the optical axis ax3, the wavelength converter 110, the pickup optical system 127, the dichroic mirror 150, the integrator optical system 131, the polarization converter 132, and the superimposing optical system 133 are disposed side by side in this order.

The collimator optical system 122 converts the excitation lights BL emitted from the first light emitting elements 121a of the first light emitting section 121 into parallel lights. The collimator optical system 122 is configured by, for example, a plurality of collimator lenses 122a arranged in an array shape. One collimator lens 122a is disposed to correspond to one first light emitting element 121a. The excitation lights BL converted into the parallel lights by the collimator optical system 122 are made incident on the afocal optical system 123.

The afocal optical system 123 converts a light beam diameter of a plurality of excitation lights BL. The afocal optical system 123 is configured from, for example, an afocal lens 123a formed by a convex lens and an afocal lens 123b formed by a concave lens. The excitation lights BL passed through the afocal optical system 123 are made incident on the homogenizer optical system 124.

The homogenizer optical system 124 converts a light intensity distribution of the excitation lights BL into a uniform distribution, a so-called top hat distribution, in an illuminated region. The homogenizer optical system 124 is configured from, for example, a multi lens array 124a and a multi lens array 124b. The excitation light BL emitted from the homogenizer optical system 124 is made incident on the dichromic mirror 150.

The dichroic mirror 150 has wavelength selectivity for reflecting a blue light component and transmitting a yellow light component. That is, the dichroic mirror 150 has a characteristic of reflecting the excitation lights BL emitted from the first light emitting section 121 and transmitting the fluorescent light YL emitted from the wavelength converter 110 explained below. The dichroic mirror 150 is disposed to form an angle of 45° with respect to the optical axis ax2 and the optical axis ax3. The excitation light BL made incident on the dichromic mirror 150 reflects on the dichroic mirror 150 and travels toward the pickup optical system 127.

The pickup optical system 127 condenses the excitation light BL toward a wavelength conversion layer 11 of the wavelength converter 110 and parallelizes the fluorescent light YL emitted from the wavelength conversion layer 11. The pickup optical system 127 is configured from a pickup lens 127a and a pickup lens 127b.

The wavelength converter 110 includes the wavelength conversion layer 11, a supporting substrate 12 that supports the wavelength conversion layer 11, and a reflection layer 13 provided between the wavelength conversion layer 11 and the supporting substrate 12. The wavelength conversion layer 11 is configured by, for example, a sintered body obtained by sintering YAG phosphor particles. The wavelength converter 110 converts the excitation light BL into the fluorescent light YL in a yellow wavelength band (first light in a first wavelength band) different from the excitation wavelength band. The fluorescent light YL has a peak wavelength in, for example, a wavelength band of 500 to 700 nm.

The supporting substrate 12 is configured from a metal material excellent in thermal conductivity such as copper or aluminum. The reflection layer 13 is configured from a metal material having high reflectance such as silver or aluminum or a dielectric multilayer film. In the fluorescent light YL generated by the wavelength conversion layer 11, the fluorescent light YL traveling toward the supporting substrate 12 is reflected by the reflection layer 13 and is emitted to the outside from the wavelength conversion layer 11. The fluorescent light YL emitted from the wavelength converter 110 travels toward the pickup optical system 127.

After being converted into parallel light by the pickup optical system 127, the fluorescent light YL is transmitted through the dichroic mirror 150 and made incident on the integrator optical system 131. The integrator optical system 131 divides the incident fluorescent light YL into a plurality of light beams. The integrator optical system 131 is configured from a first lens array 131a and a second lens array 131b. Each of the first lens array 131a and the second lens array 131b has a configuration in which a plurality of lenses are arrayed in an array shape.

The fluorescent light YL emitted from the integrator optical system 131 is made incident on the polarization converter 132. The polarization converter 132 converts the fluorescent light YL into linearly polarized light having a predetermined polarization direction. The polarization converter 132 is configured from a polarization separation film, a phase difference plate, and a mirror.

The fluorescent light YL passed through the polarization converter 132 is made incident on a superimposing lens 133a formed by a convex lens. The superimposing lens 133a superimposes the plurality of light beams emitted from the polarization converter 132 one on top of another on an illumination target object. Consequently, the illumination target object can be uniformly illuminated. The superimposing optical system 133 is configured by the integrator optical system 131 configured by the first lens array 131a and the second lens array 131b and the superimposing lens 133a. That is, the first light source device 101 includes the integrator optical system 131 including the convex lens provided on the optical path of the fluorescent light YL between the wavelength converter 110 and the light modulators 400R and 400G.

The configuration of the second light source device 102 is explained below.

Figure 3:
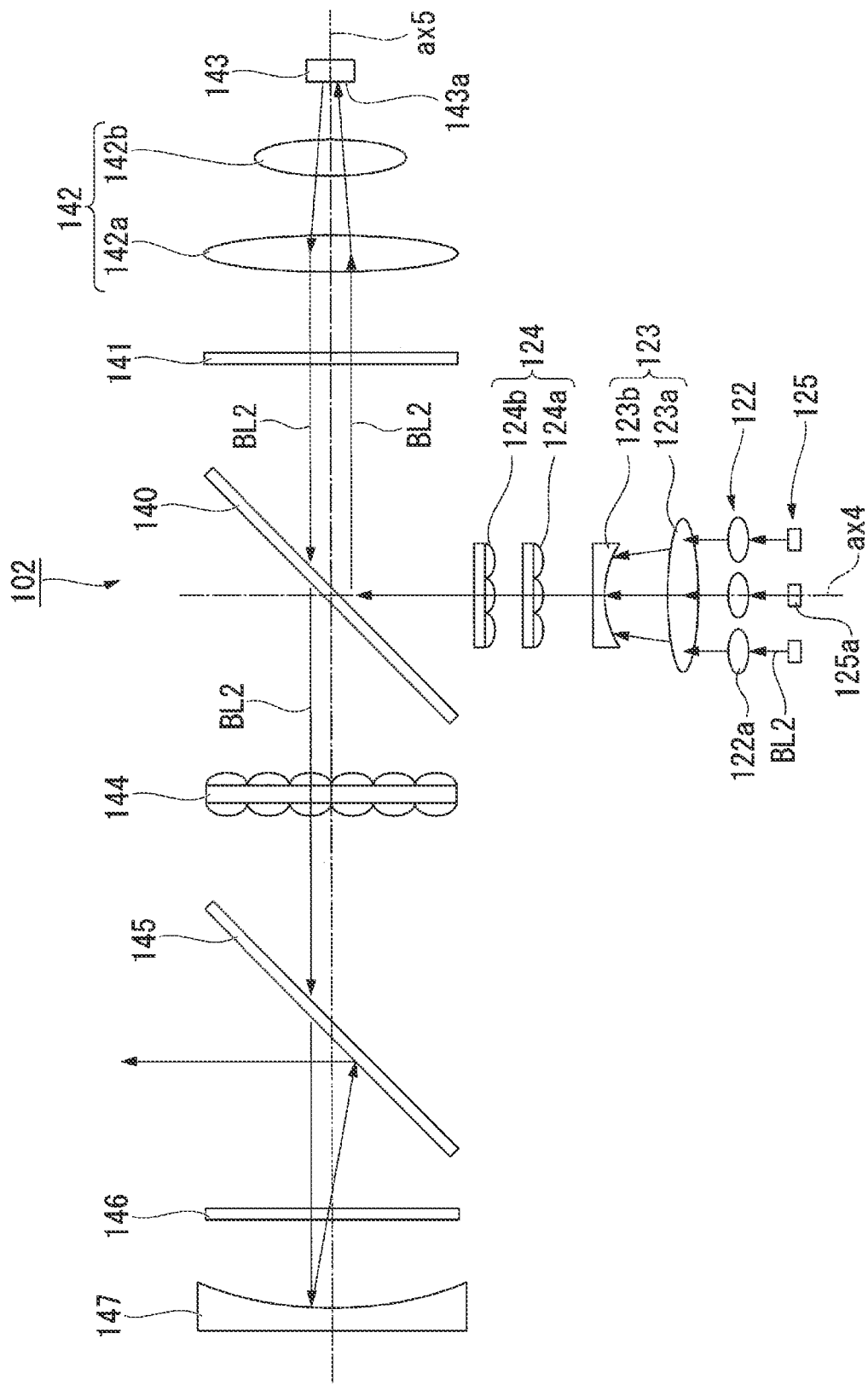
FIG. 3 is a schematic configuration diagram of a second light source device.

FIG. 3 is a schematic configuration diagram of the second light source device 102.

As shown in FIG. 3, the second light source device 102 includes a second light emitting section 125, the collimator optical system 122, the afocal optical system 123, the homogenizer optical system 124, a first polarization separation element 140, a first phase difference plate 141, a pickup optical system 142, a diffuser 143, an integrator optical system 144, a second polarization separation element 145, a second phase difference plate 146, and an aspherical concave mirror 147 (an optical element).

The second light emitting section 125 includes a plurality of second light emitting elements 125a. The plurality of second light emitting elements 125a are arrayed in an array shape in a plane orthogonal to an optical axis ax4. The number of the second light emitting elements 125a is not particularly limited. The number of the second light emitting elements 125a may be different from the number of the first light emitting elements 121a of the first light emitting section 121. The second light emitting elements 125a emit blue light BL2 (second light) having a second wavelength band. The second wavelength band may be the same as or may be different from the excitation wavelength band. The second light emitting elements 125a are configured by semiconductor laser light sources that emit linearly polarized light, specifically, S polarized light to the first polarization separation element 140. The configurations of the collimator optical system 122, the afocal optical system 123, and the homogenizer optical system 124 are the same as the configurations in the first light source device 101. Therefore, explanation of the configurations is omitted.

An optical path of a main beam emitted from the second light emitting element 125a located in the center of the second light emitting section 125 is represented as the optical axis ax4. An optical path of a main beam of the blue light BL2 emitted from the diffuser 143 explained below is represented as an optical axis ax5. The optical axis ax4 and the optical axis ax5 are present in the same plane and are orthogonal to each other.

On the optical axis ax4, the second light emitting section 125, the collimator optical system 122, the afocal optical system 123, the homogenizer optical system 124, and the first polarization separation element 140 are disposed side by side in this order. On the optical axis ax5, the diffuser 143, the pickup optical system 142, the first phase difference plate 141, the first polarization separation element 140, the integrator optical system 144, the second polarization separation element 145, the second phase difference plate 146, and the aspherical concave mirror 147 are disposed side by side in this order. The first polarization separation element 140 is disposed to form an angle of 45° with respect to the optical axis ax4 and the optical axis ax5. The second polarization separation element 145 is disposed to form an angle of 45° with respect to the optical axis ax5.

The first polarization separation element 140 reflects an S polarized light component and transmits a P polarized light component. The blue light BL2 emitted from the homogenizer optical system 124 is S polarized light. Therefore, the blue light BL2 reflects on the first polarization separation element 140 and travels toward the first phase difference plate 141.

The first phase difference plate 141 is configured by a ¼ wavelength plate for a peak wavelength of the blue light BL2. Therefore, the blue light BL2, which is the S polarized light, is transmitted through the first phase difference plate 141 to thereby be converted into, for example, the blue light BL2, which is a rightward circularly polarized light, and travels toward the pickup optical system 142.

The pickup optical system 142 focuses the blue light BL2 toward the diffuser 143 and parallelizes the blue light BL2 emitted from the diffuser 143. The pickup optical system 142 is configured from a pickup lens 142a and a pickup lens 142b.

The diffuser 143 is configured by, for example, a reflection diffuser in which an uneven structure is provided on a first surface 143a opposed to the pickup optical system 142. When the shape and the dimension of the uneven structure are optimized, the diffuser 143 has a characteristic of diffusing and reflecting the incident blue light BL2 without disturbing a polarization state of the blue light BL2. Therefore, the blue light BL2, which is the rightward circularly polarized light, made incident on the diffuser 143 is reflected by the diffuser 143 and converted into the blue light BL2, which is a leftward circularly polarized light.

After being converted into parallel light by the pickup optical system 142, the blue light BL2, which is the leftward circularly polarized light, is transmitted through the first phase difference plate 141 again to be converted into the blue light BL2, which is P polarized light, is transmitted through the first polarization separation element 140, and travels toward the integrator optical system 144.

In the second light source device 102, the integrator optical system 144 is configured by a double-sided lens array in which lens structures are formed on opposed two surfaces of a substrate. Consequently, compared with a case where an integrator optical system including two lens arrays is used, it is possible to reduce physical optical path length and achieve a reduction in the size of the second light source device 102.

The second polarization separation element 145 reflects an S polarized light component and transmits a P polarized light component. The blue light BL2 emitted from the integrator optical system 144 is P polarized light. Therefore, the blue light BL2 is transmitted through the second polarization separation element 145 and travels toward the second phase difference plate 146.

The second phase difference plate 146 is configured by a ¼ wavelength plate for a peak wavelength of the blue light BL2. Therefore, the blue light BL2, which is the P polarized light, is transmitted through the second phase difference plate 146 to thereby be converted into, for example, the blue light BL2, which is the leftward circularly polarized light, and travels toward the aspherical concave mirror 147. Details of the aspherical concave mirror 147 are explained below.

The blue light BL2, which is the leftward circularly polarized light, is reflected by the aspherical concave mirror 147 and converted into the blue light BL2, which is a rightward circularly polarized light. The blue light BL2, which is the rightward circularly polarized light, is transmitted through the second phase difference plate 146 again to be converted into the blue light BL2, which is S polarized light, reflected by the second polarization separation element 145, and emitted from the second light source device 102.

The aspherical concave mirror 147 is provided on an optical path of the blue light BL2 between the diffuser 143 and the optical modulation element 400B. The aspherical concave mirror 147 includes an aspherical reflection surface, reflects the blue light BL2 emitted from the diffuser 143 and guides the blue light BL2 to the light modulator 400B, and increases field curvature in an image forming region of the light modulator 400B. The blue light BL2 is guided to the light modulator 400B in a state in which the blue light BL2 is focused by power of the aspherical concave mirror 147. At this time, a focal position of the aspherical concave mirror 147 and a position of the light modulator 400B are set such that the blue light BL2 is focused on a peripheral edge portion rather than the center of the image forming region of the light modulator 400B. The aspherical concave mirror 147 has a characteristic of causing a barrel distortion aberration on the light modulator 400B.

The present inventor recognized that color unevenness occurred in a projected image when a general concave mirror was used in the second light source device 102 of the projector 1 in this embodiment. The present inventor focused on a difference between a characteristic of the convex lens configuring the superimposing lens 133a of the first light source device 101 and a characteristic of the concave mirror used in the second light source device 102 in a process of studying a cause of the color unevenness. The general concave mirror is a concave mirror having a reflection surface formed by a spherical surface.

A general convex lens has a large difference between a focal position in the center near an optical axis and a focal position at a peripheral edge portion far from the optical axis, that is, has large field curvature. Therefore, when the convex lens is focused on a peripheral edge portion, a beam in the center spreads to the peripheral edge portion and an image is blurred in the center. As a result, an illuminance distribution of light on an image forming region of a light modulating device easily becomes uniform. On the other hand, the general concave mirror has a small difference between the focal position in the center close to the optical axis and the focal position in the peripheral edge portion far from the optical axis, that is, has small field curvature. Therefore, when the concave mirror is focused on the peripheral edge portion of the image surface, compared with the convex lens, a beam in the center less easily spreads to the peripheral edge portion and an image is less easily blurred in the center. As a result, an illuminance distribution of light on the image forming region of the light modulating device less easily becomes uniform. Consequently, the present inventor considered that an illuminance distribution of blue light and an illuminance distribution of color lights other than the blue light were different on the image forming region of the light modulating device and, as a result, color unevenness occurred.

Therefore, the present inventor conceived that the field curvature of the concave mirror used in the optical path of the blue light in the present disclosure only has to be intentionally increased with respect to the field curvature of the general concave mirror, that is, the difference between the foal position in the center and the focal position in the peripheral edge portion only has to be increased. Consequently, the beam in the center spreads to the peripheral edge portion and the illuminance distribution of the light in the second light modulating device is made uniform. As a result, the illuminance distribution is close to the illuminance distribution of the light in the first light modulating device and the color unevenness can be reduced. "Increase field curvature" in the appended claims means that the field curvature is increased compared with the field curvature of the general concave mirror, that is, the concave mirror having the reflection surface formed by the spherical surface. A shape of the spherical surface of the concave mirror serving as a reference for the field curvature is determined by parameters such as the distance from the concave mirror to the second light modulating device.

In the illumination device 100 in this embodiment, the first light source device 101 includes the superimposing lens 133a formed by the convex lens and the second light source device 102 includes the aspherical concave mirror 147 that increases the field curvature in the light modulator 400B. Consequently, the blue light BL2 in the center spreads to the peripheral edge portion while the state in which the blue light BL2 is focused on the peripheral edge portion rather than the center of the image forming region of the light modulator 400B is maintained. As a result, the illuminance distribution of the blue light BL2 on the image forming region of the light modulator 400B easily becomes uniform. As a result, the illuminance distribution in the light modulator 400B and the illuminance distribution in the light modulators 400R and 400G are made uniform. The color unevenness can be reduced.

In the case of this embodiment, since the aspherical concave mirror 147 causes the barrel distortion aberration, the beam in the center of the image forming region easily spreads toward the peripheral edge portion. The effect of making the illuminance distribution on the image forming region of the light modulator 400B uniform can be further increased. The aspherical concave mirror 147 does not always have to have the characteristic of causing the barrel distortion aberration. However, the aspherical concave mirror 147 desirably does not have a characteristic of causing pincushion distortion aberration.

The present inventor performed a simulation for demonstrating the effect of the aspherical concave mirror used in this embodiment. A result of the simulation is explained below.

In the simulation, an illuminance distribution on the image forming region of the light modulating device at the time when light having a predetermined intensity distribution was emitted from the light emitting element was calculated. Concerning the projector 1 in this embodiment, for comparison, both of an illuminance distribution on the image forming region of the light modulator 400B by the second light source device 102 and an illuminance distribution on the image forming regions of the light modulators 400R and 400G by the first light source device 101 were calculated.

On the other hand, a light source device in which the aspherical concave mirror 147 of the second light source device 102 in the embodiment was replaced with a spherical concave mirror was used as a light source device of a comparative example. Concerning the light source device of the comparative example, an illuminance distribution on an image forming region of a light modulating device by the light source device was calculated under the same conditions as the conditions in this embodiment.

Figure 4:
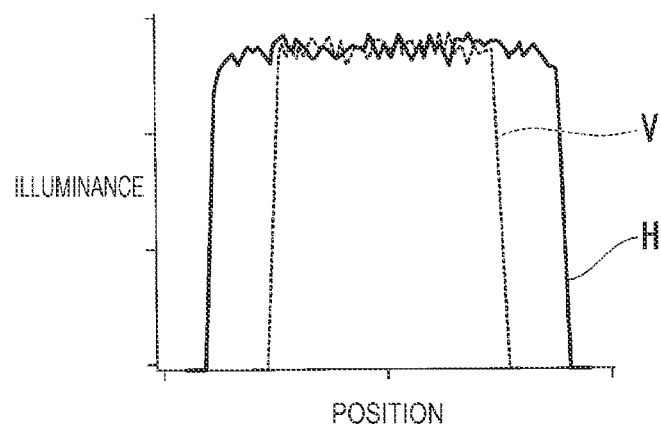
FIG. 4 is a diagram showing an illuminance distribution in an image forming region of a second light modulating device.
Figure 5:
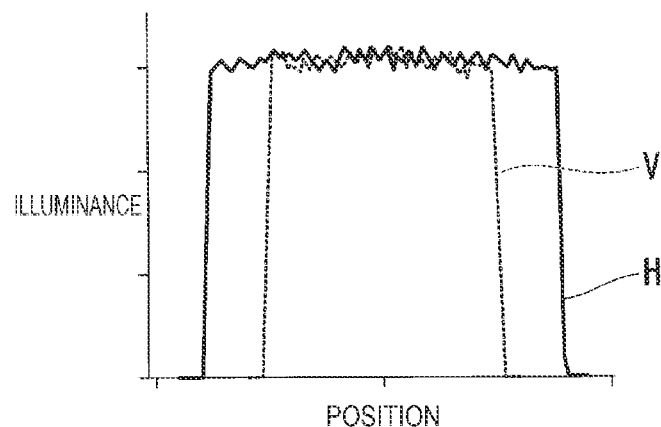
FIG. 5 is a diagram showing an illuminance distribution in an image forming region of a first light modulating device.
Figure 6:
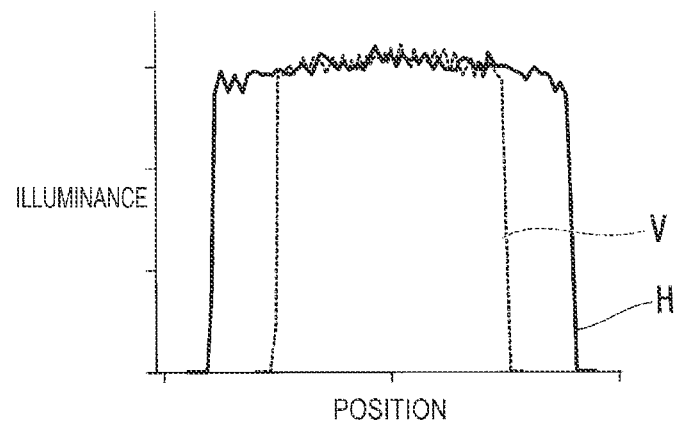
FIG. 6 is a diagram showing an illuminance distribution in the image forming region of the second light modulating device in a light source device of a comparative example.

FIG. 4 is a diagram showing an illuminance distribution on the image forming region of the light modulator 400B in the second light source device 102 in this embodiment. FIG. 5 is a diagram showing an illuminance distribution on the image forming regions of the light modulators 400R and 400G in the first light source device 101 in this embodiment. FIG. 6 is a diagram showing an illuminance distribution in the image forming region of the light modulating device in the light source device of the comparative example.

In FIGS. 4 to 6, the horizontal axis indicates a position in the image forming region of the light modulating device and the origin of the horizontal axis indicates the center of an image surface. The vertical axis indicates illuminance [a.u.]. A graph of a sign V indicates an illuminance distribution in a short side direction, which is the vertical direction, of the image forming region. A graph of a sign H indicates an illuminance distribution in a long side direction, which is the horizontal direction, of the image forming region.

As shown in FIG. 6, in the light source device in the comparative example, illuminance near the center of the image forming region is slightly high compared with illuminance near the peripheral edge portion of the image forming region in both of the graph V and the graph H. On the other hand, as shown in FIG. 4, in the second light source device 102 in this embodiment, illuminance is substantially fixed in the center and the peripheral edge portion of the image forming region in both of the graph V and the graph H. As shown in FIG. 5, in the first light source device 101 in this embodiment, illuminance is substantially fixed in the center and the peripheral edge portion of the image forming region in both of the graph V and the graph H. Therefore, in this embodiment, an illuminance distribution on the light modulator 400B by the second light source device 102 substantially coincides with an illuminance distribution on the light modulators 400R and 400G by the first light source device 101.

The simulation result explained above demonstrates that, with the second light source device 102 in this embodiment, uniformity of the illuminance distribution on the light modulator 400B can be improved compared with the comparative example by adopting the aspherical concave mirror 147 and the illuminance distribution on the light modulator 400B can be substantially matched with the illuminance distribution on the light modulators 400R and 400G. Consequently, it is possible to reduce color unevenness of an image on a screen.

Second Embodiment

A second embodiment of the present disclosure is explained below with reference to FIGS. 7 and 8.

The configurations of a projector and a first light source device in the second embodiment are the same as the configurations in the first embodiment. The configuration of a second light source device in the second embodiment is different from the configuration in the first embodiment. Therefore, explanation of the projector and the first light source device is omitted.

Figure 7:
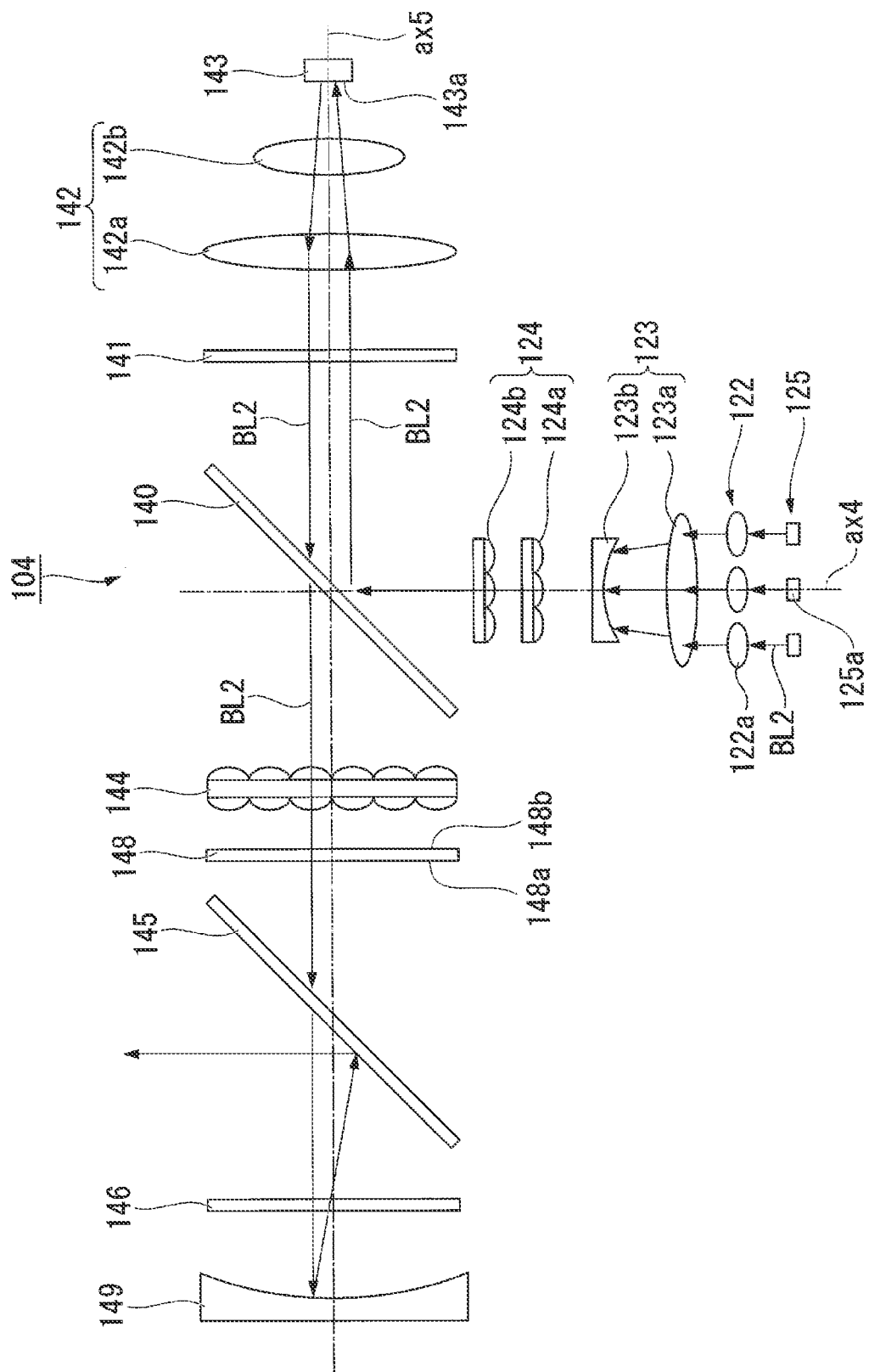
FIG. 7 is a schematic configuration diagram of a second light source device in a second embodiment.

FIG. 7 is a schematic configuration diagram of the second light source device in the second embodiment.

In FIG. 7, components common to FIG. 3 referred to in the first embodiment are denoted by the same reference numerals and signs and explanation of the components is omitted.

As shown in FIG. 7, a second light source device 104 in this embodiment includes the second light emitting section 125, the collimator optical system 122, the afocal optical system 123, the homogenizer optical system 124, the first polarization separation element 140, the first phase difference plate 141, the pickup optical system 142, the diffuser 143, the integrator optical system 144, an aspherical compensating plate (an optical element) 148, the second polarization separation element 145, the second phase difference plate 146, and a concave mirror 149.

The aspherical compensating plate 148 is provided on an optical path of the blue light BL2 between the diffuser 143 and the concave mirror 149. The aspherical compensating plate 148 is configured by a light transmissive member and has a first surface 148a and a second surface 148b. One of the first surface 148a and the second surface 148b has an aspherical surface for increasing field curvature in the light modulator 400B. "Increasing field curvature in the light modulator 400B" in this embodiment means that the field curvature in the light modulator 400B is increased compared with a case where the aspherical compensating plate 148 is not provided. The aspherical compensating plate 148 may have a characteristic of causing barrel distortion aberration. However, the aspherical compensating plate 148 desirably does not have a characteristic of causing pincushion distortion aberration.

The concave mirror 149 reflects the blue light BL2 emitted from the diffuser 143. The concave mirror 149 is different from the aspherical concave mirror 147 in the first embodiment and has a reflection surface formed by a spherical surface.

The other components of the second light source device 104 are the same as the components of the second light source device 102 in the first embodiment.

In the projector in this embodiment, since the aspherical compensating plate 148 is used, the same effects as the effects in the first embodiment can be obtained: the illuminance distribution of the blue light BL2 on the image forming region of the light modulator 400B easily becomes uniform, the illuminance distribution of the light in the light modulator 400B and the illuminance distribution of the light in the light modulators 400R and 400G are easily made uniform, and color unevenness can be reduced.

As in the first embodiment, the present inventor performed a simulation for demonstrating the effect of the aspherical compensating plate used in this embodiment.

Figure 8:
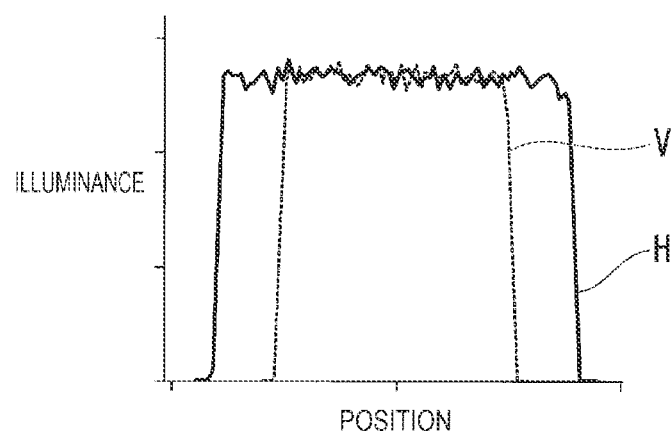
FIG. 8 is a diagram showing an illuminance distribution in an image forming region of a second light modulating device.

FIG. 8 is a diagram showing an illuminance distribution on the image forming region of the light modulator 400B in the second light source device 104 in this embodiment.

In FIG. 8, the horizontal axis indicates a position [a.u.] in the image forming region of the light modulating device and the vertical axis indicates illuminance [a.u.]. A graph of a sign V indicates an illuminance distribution in a short side direction, which is the vertical direction, of the image forming region. A graph of a sign H indicates an illuminance distribution in a long side direction, which is the horizontal direction, of the image forming region.

As shown in FIG. 8, in the second light source device 104 in this embodiment, illuminance is substantially fixed in the center and the peripheral edge portion of the image forming region in both of the graph V and the graph H. The simulation result explained above demonstrates that, in the second light source device 104 in this embodiment, as in the second light source device 102 in the first embodiment, uniformity of the illuminance distribution on the light modulator 400B can be improved, the illuminance distribution on the light modulator 400B can be substantially matched with the illuminance distribution on the light modulators 400R and 400G, and color unevenness of an image on a screen can be reduced.

The technical scope of the present disclosure is not limited to the embodiments. Various changes can be added in a range not departing from the gist of the present disclosure.

For example, in the embodiments, the light source device including a stationary wavelength converter is explained as an example of the first light source device. However, instead of this configuration, a light source device including a wavelength converter rotatable by a driving source such as a motor may be used. Similarly, in the embodiments, the light source device including a stationary diffuser is explained as an example of the second light source device. However, instead of this configuration, a light source device including a diffuser rotatable by a driving source such as a motor may be used.

Besides, specific descriptions of the shapes, the numbers, the dispositions, the materials, and the like of the components of the projector are not limited to the embodiments and can be changed as appropriate. In the embodiments, an example is explained in which the present disclosure is applied to the projector including a liquid crystal light valve. However, the present disclosure is not limited to this and may be applied to a projector including a digital micro mirror device as a light modulating device.

What is claimed is:
1. A projector comprising:
   a first light source device configured to emit first light having a first wavelength band;
   a second light source device configured to emit second light having a second wavelength band different from the first wavelength band;
   a first light modulator configured to modulate the first light emitted from the first light source device; and
   a second light modulator configured to modulate the second light emitted from the second light source device, wherein
   the first light source device includes
      a first light emitting element configured to emit excitation light having an excitation wavelength band and
      a wavelength converter configured to convert the excitation light into the first light having the first wavelength band different from the excitation wavelength band, and
   the second light source device includes
      a second light emitting element configured to emit the second light,
      a diffuser configured to diffuse the second light emitted from the second light emitting element, and
      an optical element having an aspherical surface, the optical element being disposed on an optical path of the second light between the diffuser and the second light modulator and configured to increase field curvature on the second light modulator.
2. The projector according to claim 1, wherein the second light modulator is disposed in a position where the optical element is focused on a peripheral edge portion of the second light modulator rather than a center of the second light modulator.

3. The projector according to claim 1, wherein the optical element is an aspherical concave mirror configured to reflect the second light emitted from the diffuser.

4. The projector according to claim 1, wherein
the second light source device further includes a concave mirror configured to reflect the second light emitted from the diffuser, and
the optical element is an aspherical compensating plate disposed on the optical path of the second light between the diffuser and the concave mirror.

5. The projector according to claim 1, wherein the optical element is configured to generate a barrel distortion aberration on the second light modulator.

6. The projector according to claim 1, wherein the first light source device further includes an integrator optical system including a convex lens disposed on the optical path of the first light between the wavelength converter and the first light modulator.

7. The projector according to claim 1, wherein each of the first light emitting element and the second light emitting element is a laser light source.

* * * * *